(12) United States Patent
Kuroda

(10) Patent No.: US 11,872,912 B2
(45) Date of Patent: Jan. 16, 2024

(54) SEAT SLIDING DEVICE

(71) Applicant: TF-METAL Co., Ltd., Shizuoka (JP)

(72) Inventor: Shunsuke Kuroda, Shizuoka (JP)

(73) Assignee: TF-METAL Co., Ltd., Shizuoka (JP)

( * ) Notice: Subject to any disclaimer, the term of this patent is extended or adjusted under 35 U.S.C. 154(b) by 0 days.

(21) Appl. No.: 18/168,169

(22) Filed: Feb. 13, 2023

(65) Prior Publication Data

US 2023/0256871 A1  Aug. 17, 2023

(30) Foreign Application Priority Data

Feb. 15, 2022  (JP) .................................. 2022-021061

(51) Int. Cl.
  *B60N 2/08* (2006.01)
  *B60N 2/07* (2006.01)
(52) U.S. Cl.
  CPC ........... *B60N 2/085* (2013.01); *B60N 2/0705* (2013.01)
(58) Field of Classification Search
  CPC .............................. B60N 2/085; B60N 2/0705
  USPC ......................................................... 248/430
  See application file for complete search history.

(56) References Cited

U.S. PATENT DOCUMENTS

| | | | | |
|---|---|---|---|---|
| 9,145,069 B2 * | 9/2015 | Yamada | ................ | B60N 2/0875 |
| 9,145,070 B2 * | 9/2015 | Hayashi | ............... | B60N 2/0715 |
| 9,283,870 B2 | 3/2016 | Yamada et al. | | |
| 10,556,521 B2 * | 2/2020 | Hoshihara | ............ | B60N 2/0715 |
| 10,640,015 B2 * | 5/2020 | Taniguchi | ............. | F16C 29/005 |
| 10,940,775 B2 * | 3/2021 | Tamaki | .................. | B60N 2/085 |
| 2014/0138510 A1 | 5/2014 | Yamada et al. | | |
| 2016/0221476 A1 * | 8/2016 | Satoh | ................... | B60N 2/0715 |
| 2023/0023091 A1 * | 1/2023 | Kuroda | ............... | B60N 2/0705 |
| 2023/0256872 A1 * | 8/2023 | Kuroda | ............... | B60N 2/0715 248/429 |

FOREIGN PATENT DOCUMENTS

| | | |
|---|---|---|
| JP | 2013-18400 A | 1/2013 |
| JP | 2014-83890 A | 5/2014 |

* cited by examiner

*Primary Examiner* — Anita M King
(74) *Attorney, Agent, or Firm* — Young Basile Hanlon & MacFarlane, P.C.

(57) ABSTRACT

A seat sliding device includes a lower rail, an upper rail, a lever member, a lock member, a biasing member and an operation member. The upper rail includes a shaft member, and the lever member includes bearings engaging with the shaft member. Each of the left and right bearings has a surface in contact with the shaft member at one point in an up-down direction by being biased by the biasing member. In the pair of left and right bearings, a surface in contact with the shaft member in one bearing is formed as an arc-shaped surface with a radius slightly larger than an outer diameter of the shaft member, and a surface in contact with the shaft member in the other bearing is formed as a flat surface extending relative to the upper rail in the longitudinal direction.

3 Claims, 13 Drawing Sheets

SEAT SLIDING DEVICE

CROSS REFERENCE TO RELATED APPLICATION

The present application is based on, and claims priority from Japanese Patent Application No. 2022-021061, filed on Feb. 15, 2022, the entire contents of which are incorporated herein by reference.

TECHNICAL FIELD

The present disclosure relates to a seat sliding device used for a seat for a vehicle.

BACKGROUND

In a seat sliding device for a vehicle, an upper rail fixed to a seat is provided to be slidably movable on a lower rail fixed to a vehicle body, and lock teeth (lock portions) of a lock member attached to the upper rail engage with lock grooves (locked portions) in the lower rail to lock the seat. The seat sliding device is provided with a lever member for operating the lock portions in a lock release direction, and the front side part of the lever member from the turning center is biased upward by a biasing member. An operation member is connected to the front end of the lever member, and the lever member is configured to rotate with the operation member by lifting the operation member upward.

In JP2013-18400 A, a shaft member is axially supported in shaft mounting holes provided on both left and right side walls of the upper rail, and the shaft member is inserted into shaft mounting holes provided on both the left and right side walls of the lever member, and thus the lever member is turnably supported with respect to the upper rail. Each of these four shaft mounting holes is formed concentrically, however, a displacement in the up-down direction or in the front-rear direction may occur in the four shaft mounting holes due to variations in the concentricity of the four shaft mounting holes. In this case, when the shaft mounting holes deviate, especially with respect to the vehicle front-rear direction, the side walls of the lever member are pushed against and are in contact with the inner surface of the side walls of the opposing upper rail because the lever member is long in the vehicle front-rear direction, which may cause abnormal noise. Further, in a case where the shaft mounting holes greatly deviate, when the lever member turns in the lock release direction and the lock portions come away from the guide claws (guide portions) provided on the side walls of the upper rail, the lever member may deviate more increasingly to the left and right, which may cause the seat not to be locked again.

Meanwhile, JP2014-83890 A discloses a structure in which the shaft mounting holes on both the left and right side walls of the upper rail are made as long holes in the vehicle front-rear direction and wedges are provided to restrict the shaft member from moving in the front-rear direction.

SUMMARY

However, in the structure of JP2014-83890 A, the fact remains that the wedges restrict the shaft member from moving in the front-rear direction, and thus applying the structure of JP2014-83890 A to the shaft mounting holes of JP2013-18400 A does not solve the above problem in JP2013-18400 A.

Accordingly, an object of the present invention is to suppress rattling of the upper rail in the vehicle front-rear direction when the seat is locked.

A seat sliding device according to the present invention includes a lower rail extending in a vehicle front-rear direction, an upper rail configured to move relative to the lower rail in a longitudinal direction, a lever member turnably supported about an axis in a left-right direction with respect to the upper rail, a lock member provided in a rear end of the lever member and including lock portions configured to be movable between a lock position where the lock portions engage with locked portions formed in the lower rail and a lock release position where the lock portions come away from the locked portions, a biasing member configured to bias the lock portions in a lock position direction, and an operation member connected to a front end of the lever member. The upper rail includes a shaft member disposed in such a way as to straddle both left and right side walls of the upper rail. The lever member includes a pair of left and right side walls extending relative to the upper rail in the longitudinal direction, at inner sides of both the left and right side walls of the upper rail, and bearings provided at the pair of left and right side walls and engaging with the shaft member. Each of the left and right bearings has a surface in contact with the shaft member at one point in an up-down direction by being biased by the biasing member. In the pair of left and right bearings, a surface in contact with the shaft member in one bearing is formed as an arc-shaped surface with a radius slightly larger than an outer diameter of the shaft member, and a surface in contact with the shaft member in the other bearing is formed as a flat surface extending relative to the upper rail in the longitudinal direction.

The present invention makes it possible to suppress rattling of the upper rail in the vehicle front-rear direction when the seat is locked.

DETAILED DESCRIPTION

An embodiment of the present invention will be described below with reference to the drawings.

First Embodiment

Figure 1:
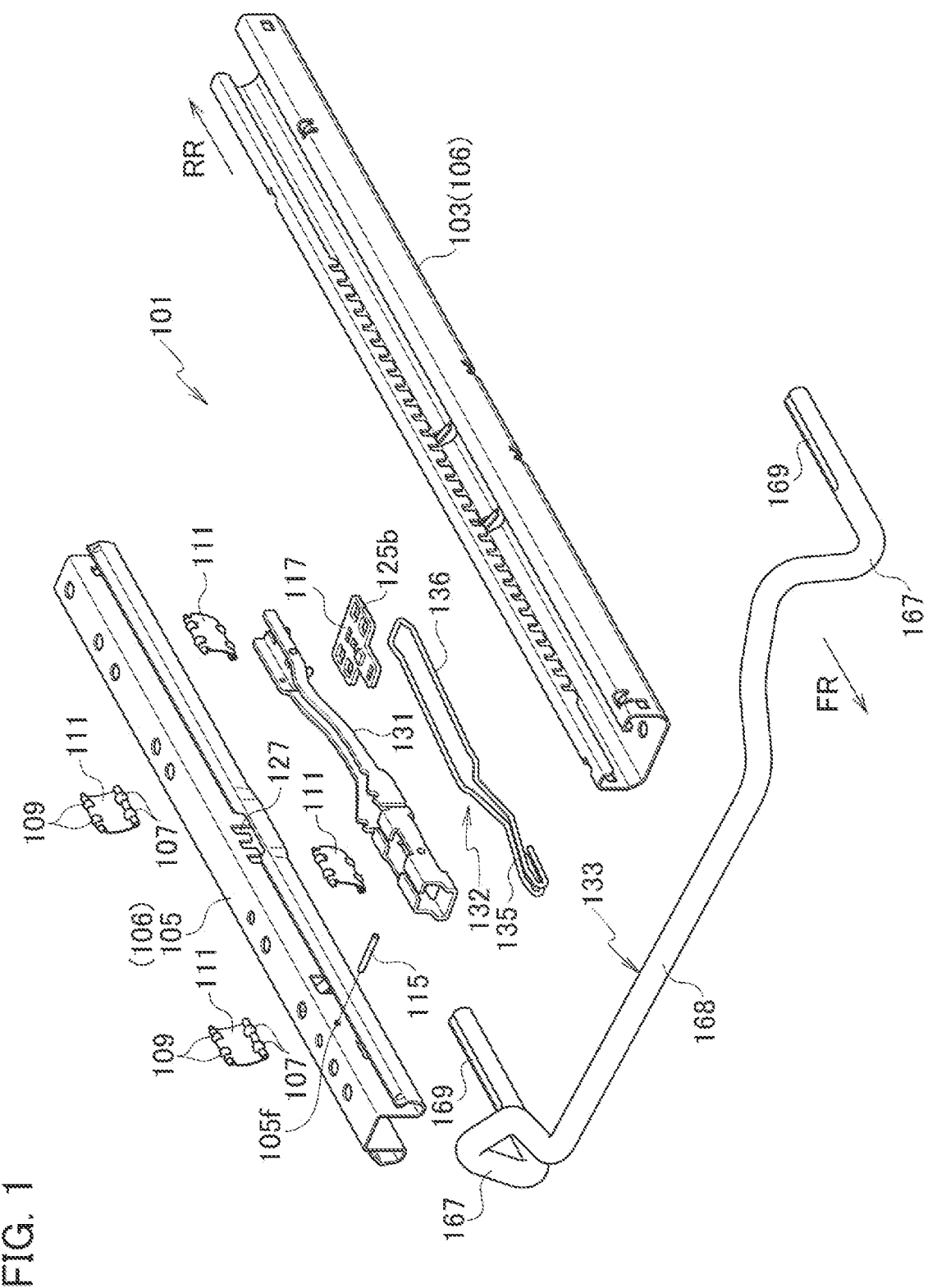
FIG. 1 is an exploded perspective view of a seat sliding device according to a first embodiment of the present invention.
Figure 2:
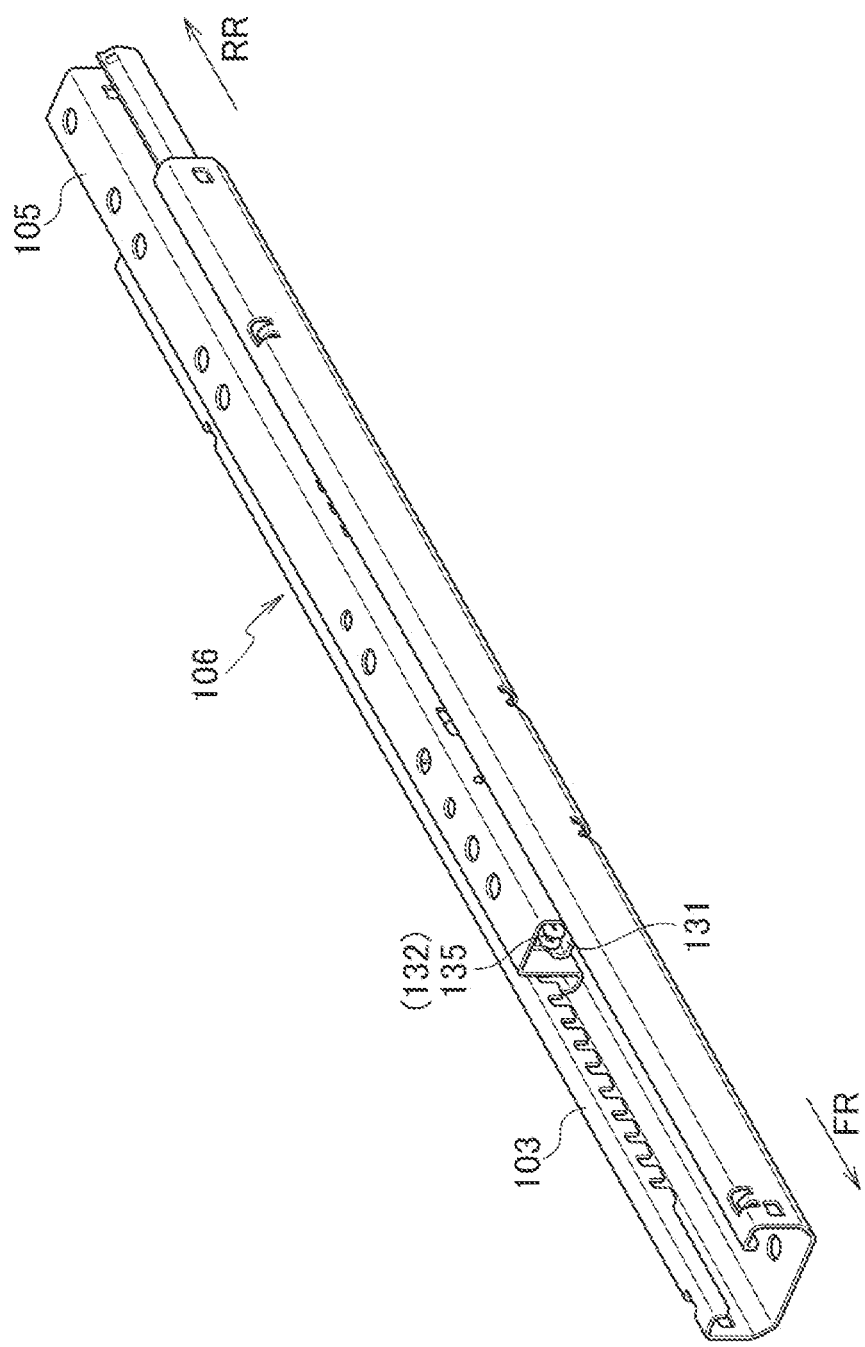
FIG. 2 is a perspective view illustrating a state in which an upper rail is assembled to a lower rail, together with a lever member and a biasing member.
Figure 3:
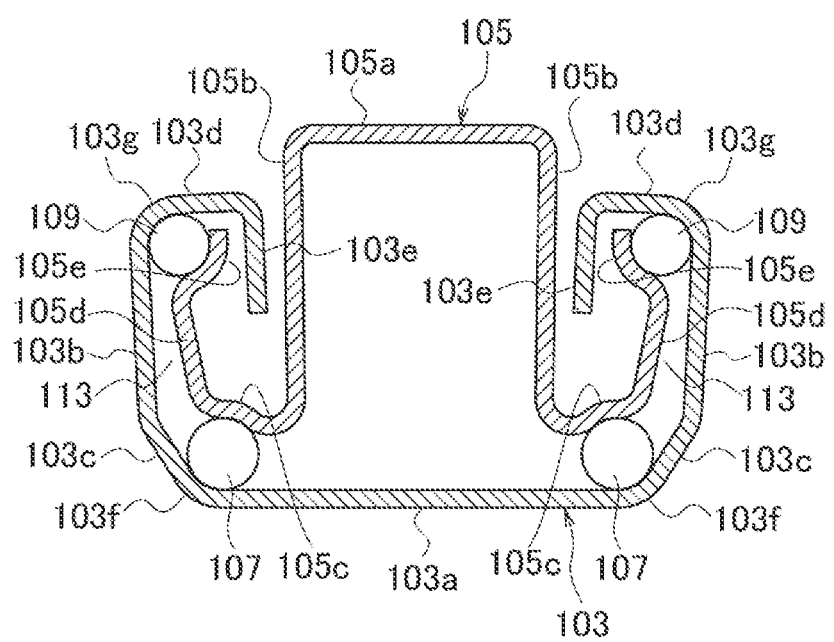
FIG. 3 is a cross-sectional view of the seat sliding device including lower guide balls and upper guide balls disposed between the upper rail and the lower rail.

A seat sliding device 101 according to a first embodiment of the present invention illustrated in FIGS. 1 to 3 is a manual seat sliding device in which the position of a vehicle seat in a front-rear direction is adjusted manually. The seat sliding device 101 includes a lower rail 103 installed on a floor surface of a vehicle and extending in a vehicle front-rear direction, and an upper rail 105 installed on a back surface of a seating portion (not illustrated) of a seat and assembled to be movable within the lower rail 103 in a relative manner in a longitudinal direction of the lower rail 103. The lower rail 103 and the upper rail 105 form a rail body 106 and a pair of left and right rail bodies 106 are provided. Note that, in the following description (including the other embodiments), "front" is the vehicle front FR side which is the left side in FIG. 1, "rear" is the vehicle rear RR side which is the right side in FIG. 1, and "left-right" is the left-right direction when viewing the vehicle front side from the vehicle rear side.

As illustrated in FIG. 3, the lower rail 103 includes a lower bottom wall 103a having a rectangular plate shape extending in the vehicle front-rear direction. A pair of left and right lower outer walls 103b rise from both end edges of the lower bottom wall 103a in a vehicle width direction so as to tilt slightly outward from the lower bottom wall 103a in the upward direction. Lower tilted walls 103c are formed between the lower bottom wall 103a and lower ends of the respective left and right lower outer walls 103b. A pair of left and right lower upper walls 103d extending in parallel with the lower bottom wall 103a are provided from upper end edges of the respective left and right lower outer walls 103b in a direction approaching each other.

A pair of left and right lower inner walls 103e are provided to hang down from inner end edges of the respective left and right lower upper walls 103d toward the lower bottom wall 103a. Note that a clearance between the lower inner walls 103e disposed parallel to and facing each other is set large enough to allow movement of the upper rail 105 housed in the lower rail 103.

The upper rail 105 includes an upper top wall 105a having a rectangular plate shape extending in the vehicle front-rear direction. A pair of left and right upper side walls 105b hang down from both end edges of the upper top wall 105a in the vehicle width direction. Upper lower-tilted-walls 105c rise obliquely outward and upward from lower end edges of the respective left and right upper side walls 105b. Upper upper-tilted-walls 105e rise obliquely upward toward the lower upper walls 103d from upper end edges of the respective left and right upper lower-tilted-walls 105c via bent portions 105d.

Lower guide balls 107 are rotatably disposed between lower arc portions 103f of the lower rail 103 and the upper lower-tilted-walls 105c of the upper rail 105, and the lower arc portions 103f are formed between the lower bottom wall 103a and the lower tilted walls 103c of the lower rail 103. Upper guide balls 109 are rotatably disposed between upper arc portions 103g of the lower rail 103 and the upper upper-tilted-walls 105e of the upper rail 105, and the upper arc portions 103g are formed between the lower outer walls 103b and the lower upper walls 103d of the lower rail 103.

As illustrated in FIG. 1, the lower guide balls 107 and the upper guide balls 109 are rotatably supported in ball retainers 111 omitted in FIG. 3. Each of the ball retainers 111 supports a total of four balls which are two lower guide balls 107 and two upper guide balls 109. The ball retainers 111 supporting the lower guide balls 107 and the upper guide balls 109 are disposed at two positions on the front and the rear sides in housing portions 113 (FIG. 3) surrounded by the lower outer walls 103b, the lower tilted walls 103c, the lower upper walls 103d and the lower inner walls 103e, and are disposed at a total of four positions in the pair of left and right rail bodies 106.

Figure 14:
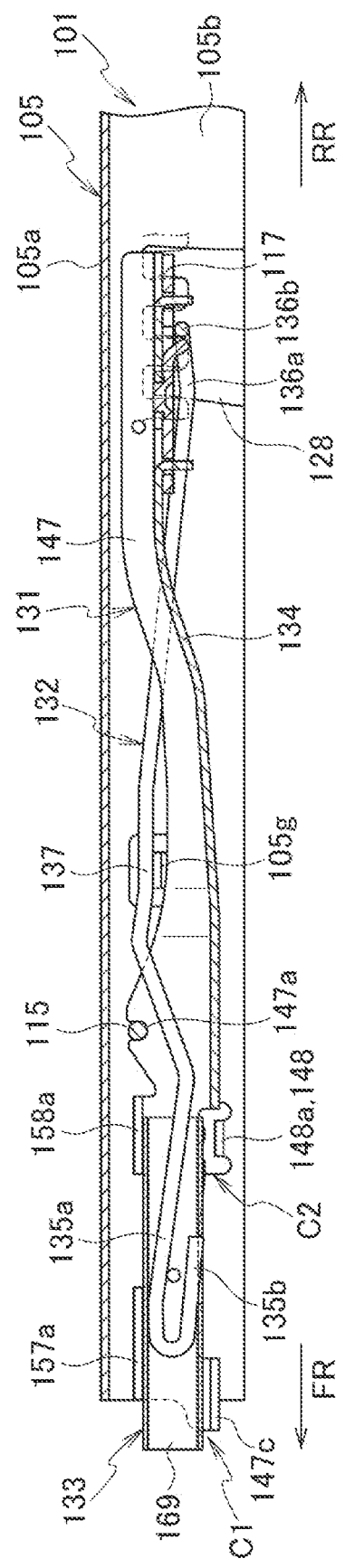
FIG. 14 is a side sectional view of the enlarged main portion of the seat sliding device.

As illustrated in FIG. 14, in the assembled state of the rail bodies 106, a lever member 131 is turnably supported by a shaft member 115 on the upper side wall 105b on the front side of the upper rail 105. The shaft member 115 extends between the left and right upper side walls 105b so as to straddle the left and right upper side walls 105b of the upper rail 105. A lock member 117 is provided at the end of the lever member 131 on the rear side from the turning center (shaft member 115). Meanwhile, an operation member 133 is connected to the end of the lever member 131 on the front side from the turning center (shaft member 115).

Figure 6:
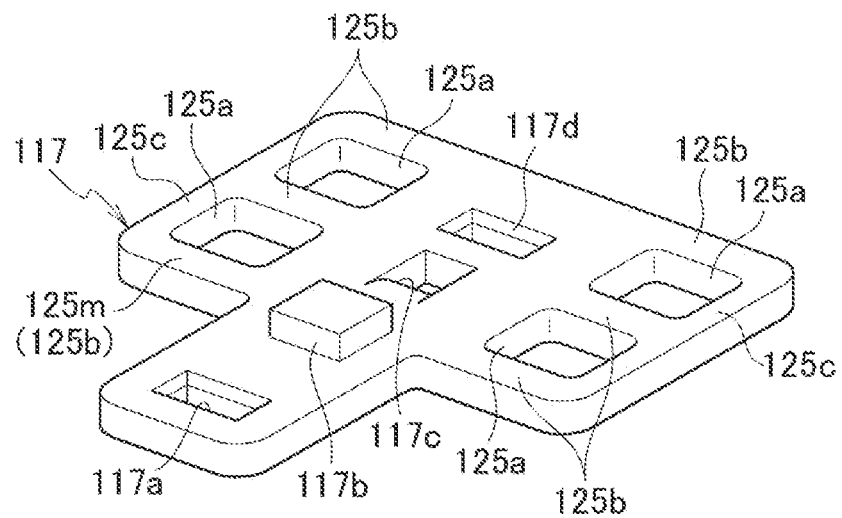
FIG. 6 is a perspective view of a lock member.

As illustrated in FIG. 6, the lock member 117 is a flat plate with a convex shape, and two rectangular holes 125a are formed near each of the left and right edges of the lock member 117 in the front-rear direction. Portions of the lock member 117 adjacent to the respective holes 125a in the front-rear direction form lock teeth 125b, which are lock portions, protruding leftward and rightward. The lock teeth 125b are formed at three positions on each of the left and right sides. Distal ends of the lock teeth 125b formed at the three positions on each of the left and right sides are configured to be connected to one another by respective connecting portions 125c extending in the front-rear direction.

In the present embodiment, among the lock teeth 125b at three positions on the right side in the vehicle width direction, the lock tooth 125b on the foremost side forms a main lock tooth 125m, which is formed with a larger width in the front-rear direction than the other lock teeth 125b. The main lock tooth 125m is only one among the plurality of lock teeth provided on each of the left and right sides (six positions).

In the center of the lock member 117 in the left-right direction, a front fixing hole 117a, an upper protrusion 117b protruding upward from the lock member 117, a lower protrusion 117c protruding downward from the lock member 117, and a rear fixing hole 117d are provided in this order from the front to the rear. The upper protrusion 117b is formed by causing a part of the lock member 117 to protrude downward, and the lower protrusion 117c is formed by cutting and raising the lock member 117 downward.

Figure 5:
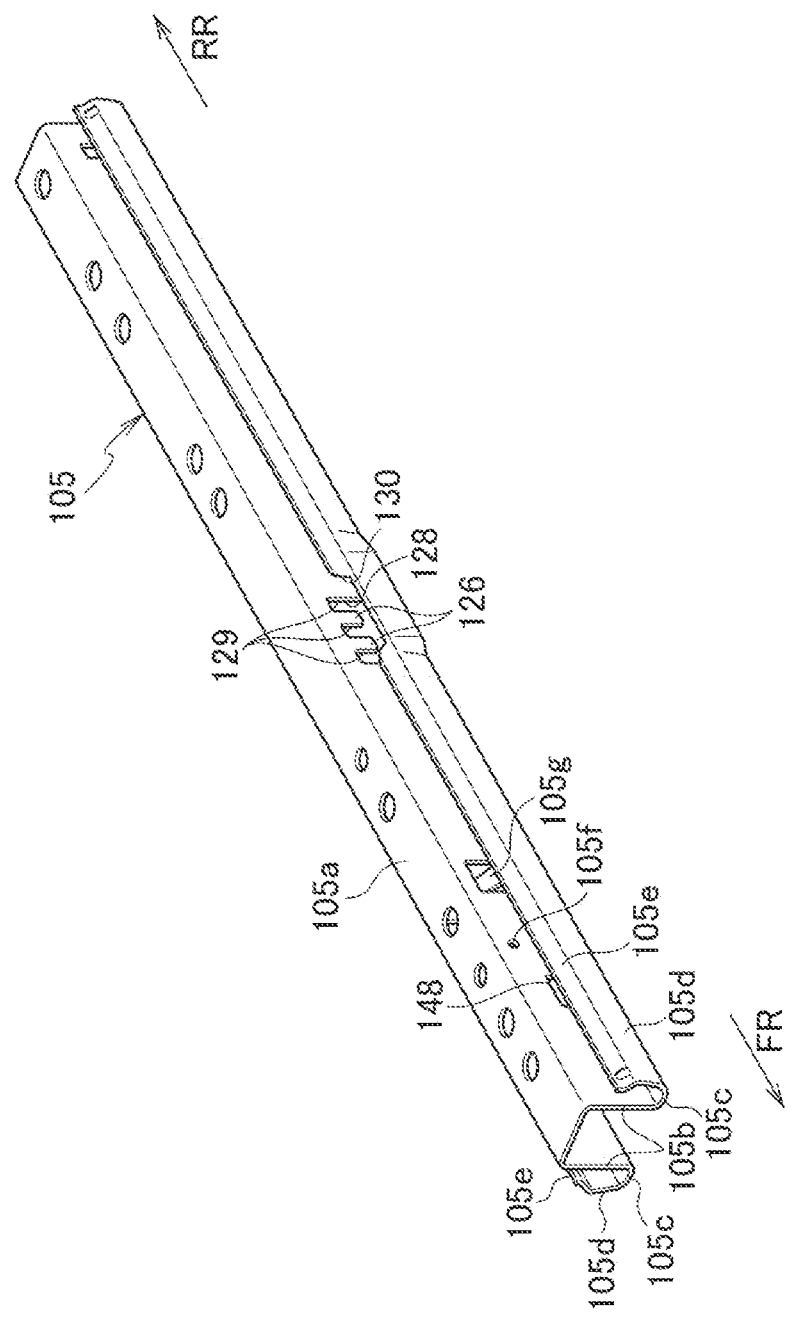
FIG. 5 is a perspective view of the upper rail.

As illustrated in FIG. 5, lock tooth receiving recesses 129 are formed near a substantially-center portion of the upper rail 105 in the front-rear direction so as to extend from the left and right upper side walls 105b to the left and right upper lower-tilted-walls 105c, and are formed at three positions on each of the left and right sides in the front-rear direction. In a state where the rail bodies 106 are assembled, the respective three lock teeth 125b of the lock member 117 are inserted into the three lock tooth receiving recesses 129 from below. At this time, protrusions 126 positioned between the lock tooth receiving recesses 129 are inserted into the holes 125a of the lock member 117. In this case, in order to avoid interference between the upper rail 105 and portions around the connecting portions 125c of the lock member 117, an opening 128 continuous with lower portions of the lock tooth receiving recesses 129 and a notch opening 130 formed in the upper upper-tilted-wall 105e are provided on each of the left and right sides of the upper rail 105.

Further, the left and right upper side walls 105b of the upper rail 105 are provided with a bearing hole 105f through which the shaft member 115 is inserted and a engaging portion 105g for engaging with a biasing member 132 which will be described later. In the upper side walls 105b, the engaging portion 105g is provided at the rear side of the lever member 131 from the turning center (shaft member 115). The engaging portion 105g is formed by cutting and raising the upper side walls 105b toward the inner side.

Figure 4:
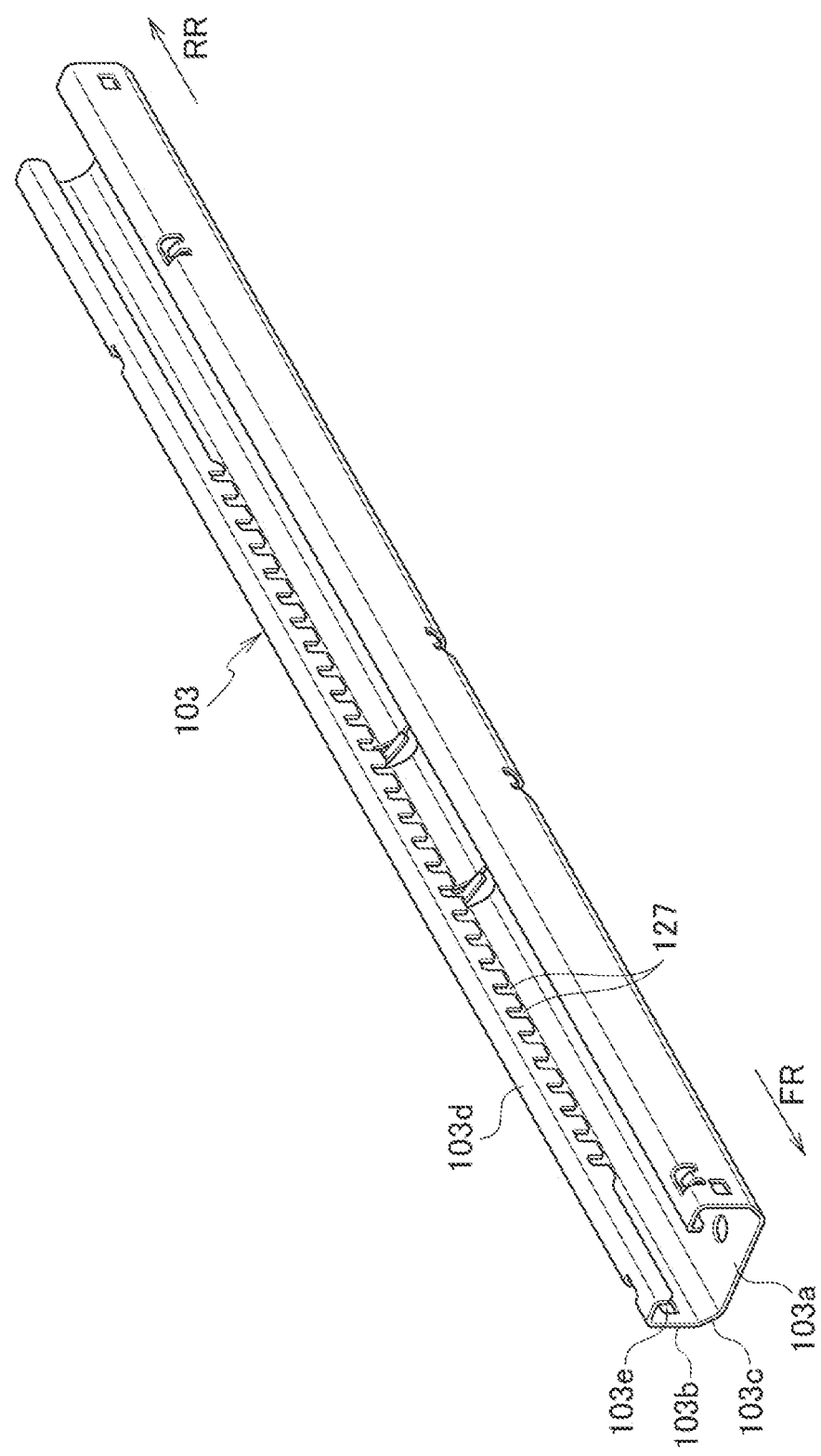
FIG. 4 is a perspective view of the lower rail.

Further as illustrated in FIG. 4, a plurality of lock grooves 127, which are locked portions, are provided in the lower rail 103 in the front-rear direction except for positions near front portions and rear portions of the left and right lower inner walls 103e. The lock member 117 is set to be locked to the lower rail 103 by inserting the lock teeth 125b of the lock member 117 into the lock grooves 127 from below with the lock teeth 125b positioned in the lock tooth receiving recesses 129. This makes it possible to prevent the upper rail 105 to which the lock member 117 is attached from moving relative to the lower rail 103 in the front-rear direction.

The biasing member 132 generates an elastic force upward in the state where the lock member 117 is attached to the upper rail 105, and thus, it is possible to maintain the state where the lock teeth 125b are inserted in the lock grooves 127. Operating the operation member 133 illustrated in FIG. 1 in the lock release direction (upward) in this state causes the lock member 117 to be pushed downward via the lever member 131, and thus the lock is released. The operation member 133 is inserted into the upper rail 105 from the front side, and is disposed so as to be interlocked with the lever member 131.

Figure 7:
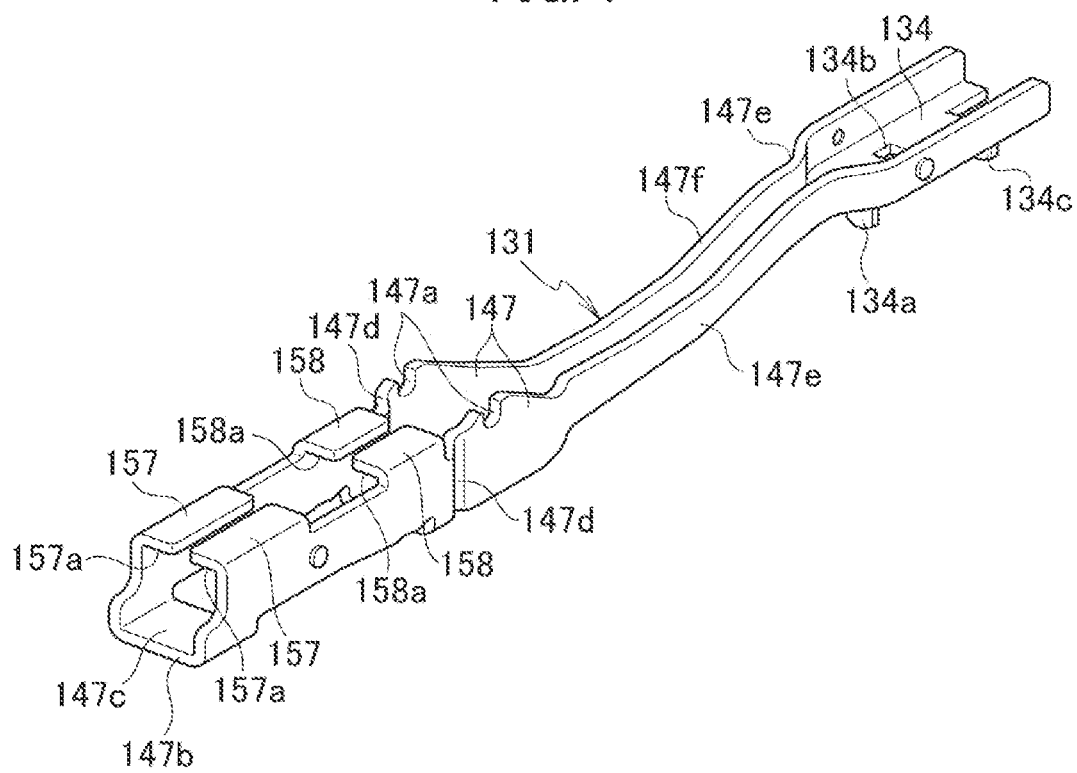
FIG. 7 is a perspective view of a lever member.

As illustrated in FIG. 7, the lever member 131 includes left and right side walls 147 extending relative to the upper rail 105 in the longitudinal direction and facing each other with a predetermined clearance in the left-right direction, and a lower wall 134 connecting the lower ends of the left and right side walls 147 to each other in a region excluding the ends of the left and right side walls 147 on the front side.

Figure 13A:
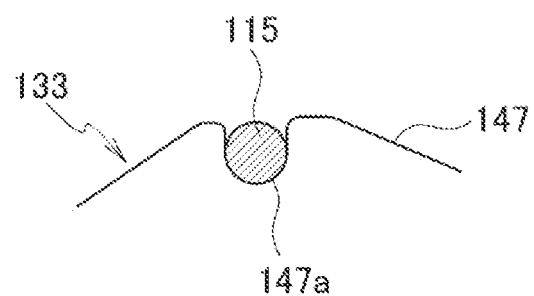
FIG. 13A is a side sectional view of an enlarged main portion of the seat sliding device illustrating one bearing.
Figure 13B:
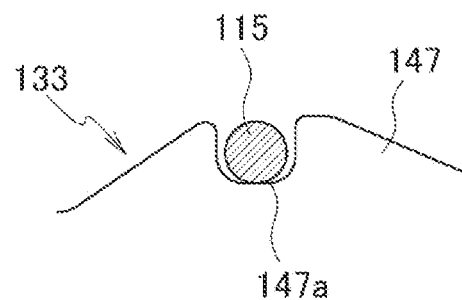
FIG. 13B is a side sectional view of the enlarged main portion of the seat sliding device illustrating the other bearing.

A pair of left and right recessed grooves 147a, which are bearings, are formed at the upper ends of the side walls 147 on the front side from the intermediate position of the lever member 131 in the front-rear direction. Of the pair of left and right recessed grooves 147a, the bottom surface of the right recessed groove 147a is formed as a semi-circular arc-shaped surface with a radius slightly larger than the outer diameter of the shaft member 115 (see FIG. 13A), and the bottom surface of the left recessed groove 147a is formed as a flat surface extending in the vehicle front-rear direction (see FIG. 13B). The recessed grooves 147a engage with the shaft member 115 from below, and the lever member 131 is biased upward at the respective front and rear ends so as to maintain a state in which the recessed grooves 147a engage with the shaft member 115, and thus the bottom surfaces of the left and right pair of recessed grooves 147a are in contact with the shaft member 115 at one point in the up-down direction. Here, the radius of the aforementioned arc-shaped surface is set slightly larger than the outer diameter of the shaft member 115 to the extent that the engagement with the shaft member 115 does not become a pressed fit due to variations in dimensions.

Although not illustrated, in another embodiment, one bearing of the pair of left and right bearings may be formed as a round hole and the other bearing may be formed as an elongated hole extending in the vehicle front-rear direction.

At the lower wall 134 at the rear end of the lever member 131, a front protrusion 134a protruding downward from the lower wall 134, a positioning hole 134b, and a rear protrusion 134c protruding downward from the lower wall 134 are provided in this order from the front to the rear. The front protrusion 134a and the rear protrusion 134c are formed by cutting and raising the lower wall 134 downward.

Figure 9:
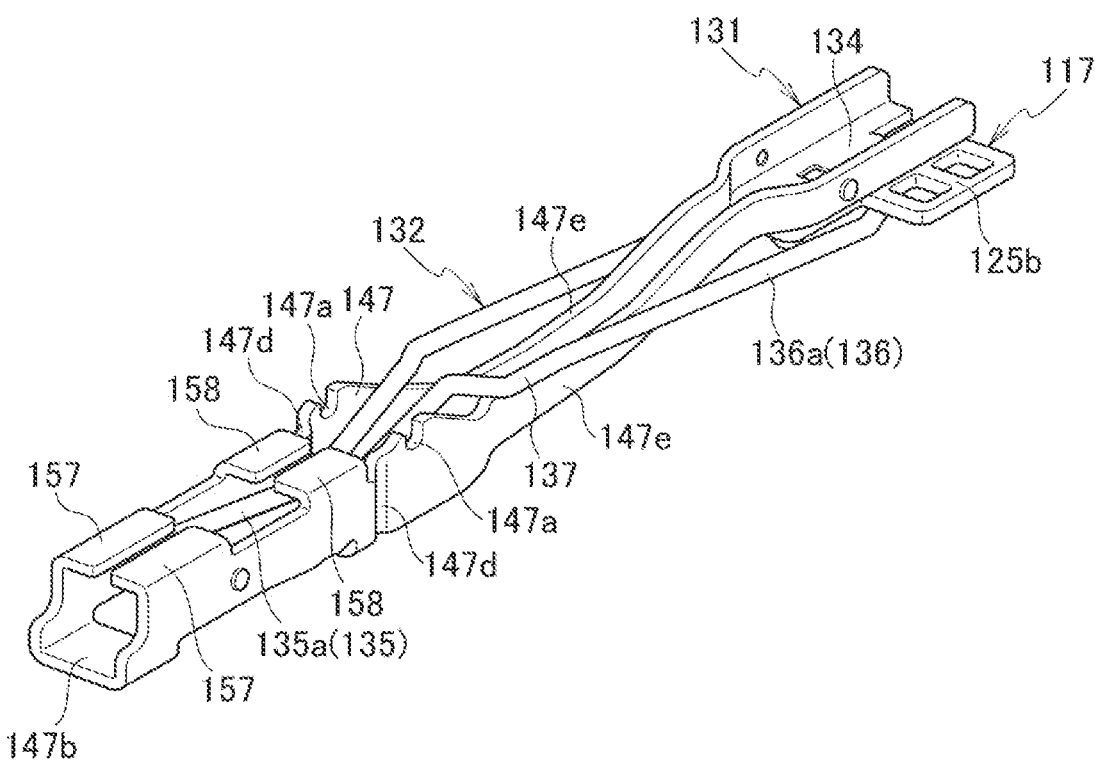
FIG. 9 is a perspective view illustrating a state in which the biasing member is assembled to the lever member.
Figure 10:
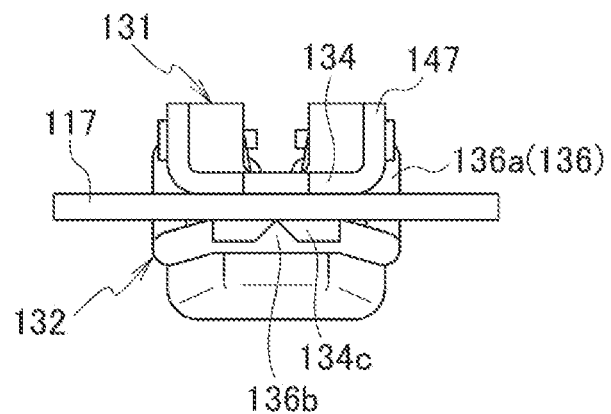
FIG. 10 is a rear view of the lever member and the biasing member as viewed from the rear.

The front protrusion 134a and the rear protrusion 134c of the lever member 131 are inserted into the front fixing hole 117a and the rear fixing hole 117d of the lock member 117 respectively, and the upper protrusion 117b of the lock member 117 is inserted into the positioning hole 134b of the lever member 131 by press fitting. In this state, the lock member 117 is fixed to the rear end of the lever member 131 by staking the front protrusion 134a and the rear protrusion 134c (see FIGS. 9 and 10).

The lower ends of the front ends of the lever member 131 are connected to each other by a front lower wall 147b as a front lower support portion extending in the left-right direction facing toward the lower end on the opposite side. The upper surface of the front lower wall 147b forms a front lower support surface 147c. At the upper ends of the front ends of both side walls 147, front upper protrusions 157 are formed as front upper support portions extending in the left-right direction from both side walls 147 in such a way to bend toward the opposite sides facing each other. The tips of the left and right front upper protrusions 157 are separated from each other, and a gap is formed therebetween. The lower surfaces of the front upper protrusions 157 form front upper support surfaces 157a.

At the upper portions of both side walls 147, which are positioned rearward of the front upper protrusions 157 and forward of the recessed grooves 147a, rear upper protrusions 158 are formed as rear upper support portions extending in the left-right direction from both side walls 147 in such a way to bend toward the opposite sides facing each other. The lower surfaces of the rear upper protrusions 158 form rear upper support surfaces 158a. That is, a pair of upper support surfaces (front upper support surface 157a and rear upper support surface 158a) facing an upper surface 169b1 of the rear end of the operation member 133 are provided at the front end of the lever member 131. Here, the pair of upper support surfaces are provided with a clearance between the pair of upper support surfaces in the vehicle front-rear direction. Further, the front lower support surface 147c facing a lower surface 169b3 of the rear end of the operation member 133 is provided below the front upper support surfaces 157a at the front end of the lever member 131.

The front end of the lever member 131 is formed into a substantially square cross-section by the front upper support surfaces 157a, the front lower support surface 147c and both side walls 147, and the rear end of the operation member 133 is inserted inside the front end of the lever member 131.

In addition, movement prevention protrusions 147*d* protruding from both side walls 147 toward the sides facing each other are formed on both side walls 147 which are positioned rearward of the rear upper protrusions 158 and forward of the recessed grooves 147*a*. The movement prevention protrusions 147*d* are formed by causing a part of both side walls 147 to protrude inward.

In addition, a pair of left and right recesses 147*e* are provided on both side walls 147 which are positioned rearward of the recessed grooves 147*a* and forward of the front protrusion 134*a*, and a narrow portion 147*f* is formed having a clearance between both side walls 147 that is narrower than the clearance between the front ends and the clearance between the rear ends.

Figure 8:
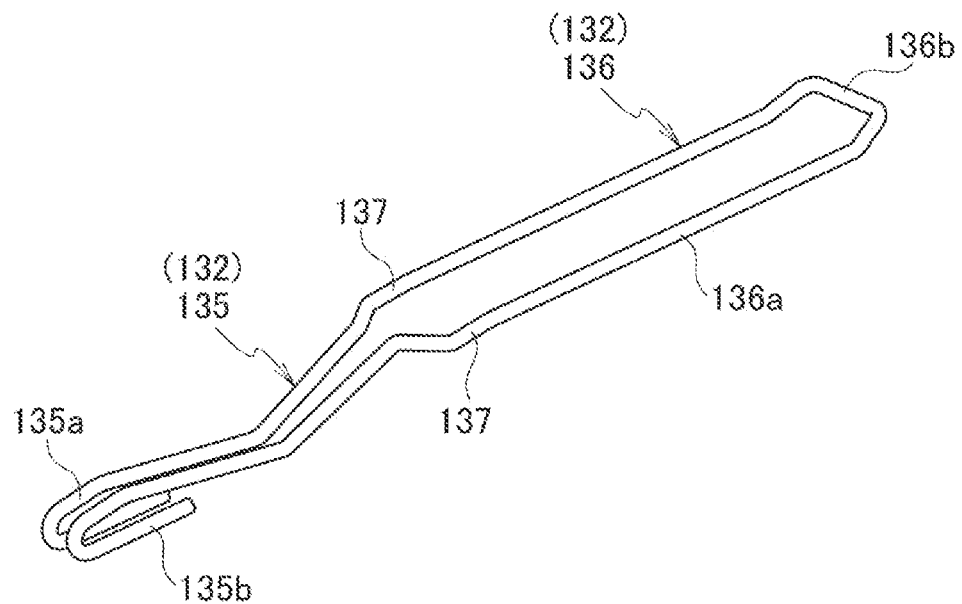
FIG. 8 is a perspective view of a biasing member.

As illustrated in FIG. 8, the biasing member 132 is formed into a pair of elongated bars extending approximately parallel to each other, and extends in the front-rear direction along the upper side walls 105*b* of the upper rail 105 inside the upper rail 105. The biasing member 132 has a front biasing member 135 including front acting portions 135*a* which come in contact with the front end of the lever member 131 to bias the front end of the lever member 131 upward. In addition, the biasing member 132 has a rear biasing member 136 including rear acting portions 136*a* which come in contact with the rear end of the lever member 131 to bias the rear end of the lever member 131 upward. In addition, the biasing member 132 has intermediate support portions 137 which are formed between the front acting portions 135*a* and the rear acting portions 136*a* and engaged with the engaging portions 105*g* provided on the upper side walls 105*b* of the upper rail 105.

The rear biasing member 136 has a connecting portion 136*b* extending from the intermediate support portions 137 to the rear acting portions 136*a* along the left and right upper side walls 105*b*, and the pair of left and right rear acting portions 136*a* are connected to each other by the connecting portion 136*b* positioned at the rear end of the rear biasing member 136. The connecting portion 136*b* of the rear biasing member 136 comes in contact with the lower surface of the lock member 117 from below, and thus the rear side acting portions 136*a* (connecting portion 136*b*) bias the lock member 117 upward (in the lock position direction). The connecting portion 136*b* of the rear biasing member 136 is positioned between the lower protrusion 117*c* and the rear protrusion 134*c*, thereby defining the range of movement of the rear biasing member 136 (biasing member 132) in the front-rear direction.

The rear end of the rear biasing member 136 (rear acting portions 136*a*, connecting portion 136*b*) is positioned below the lever member 131 and the lock member 117, and the intermediate portions (intermediate support portions 137) extend upward of the lever member 131 through the recesses 147*e* (between the narrow portion 147*f* and the upper side wall 105*b*).

Meanwhile, the front biasing member 135 has retaining portions 135*b* at the front ends. The retaining portions 135*b* extend from the intermediate support portions 137 to the front acting portions 135*a* along both the left and right upper side walls 105*b* and are folded downward to be engaged with a engaging hole 133*a* provided in the lower surface of the operation member 133. The front acting portions 135*a* of the front biasing member 135 come in contact with the operation member 133 from below, and the front acting portions 135*a* bias the front end of the lever member 131 upward via the operation member 133.

The front biasing member 135 extends forward between both side walls 147 with the rear ends (intermediate support portions 137) positioned above the lever member 131 and the front ends (front acting portions 135*a*) bent inward so as to approach each other.

In the present embodiment, the front biasing member 135 and the rear biasing member 136 are integrally formed (one member).

Although not illustrated, the front biasing member 135 and the rear biasing member 136 may be separate components (separate members) in another embodiment.

As illustrated in FIG. 1, the operation member 133 includes a pair of left and right arms 167 provided respectively for the pair of left and right rail bodies 106, and a grip 168 extending in the vehicle width direction to connect the pair of left and right arms 167 to each other. The pair of left and right arms 167 extend in the front-rear direction and have rear ends which are inserted respectively into the left and right upper rails 105 from the front ends. The grip 168 is gripped by an occupant when the occupant operates the operation member 133.

As illustrated in FIG. 14, the rear end of the arm 167 is inserted between the left and right side walls 147 of the lever member 131. The arm 167 is formed of a cylindrical member as a whole including the grip 168, and the rear end of the arm 167 described above is a connection end 169 serving as a rear connecting portion formed by press molding of the cylindrical member.

Figure 11A:
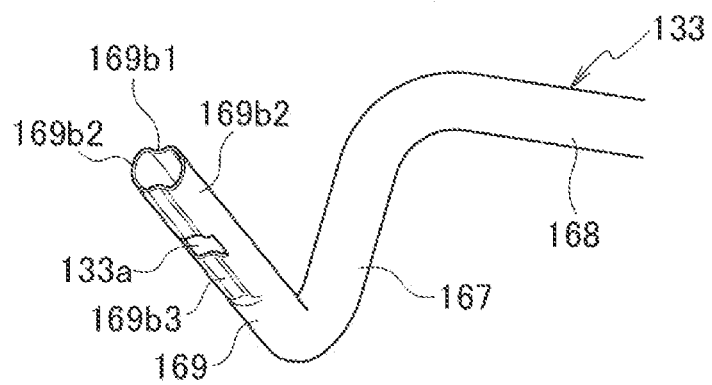
FIG. 11A is a perspective view of a portion of the operation member as viewed from below.
Figure 11B:
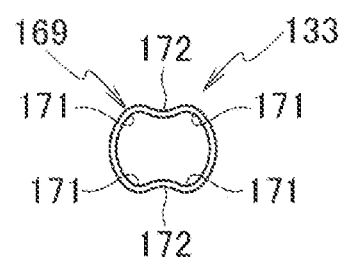
FIG. 11B is a rear view of a rear end of the operation member as viewed from the rear.
Figure 12:
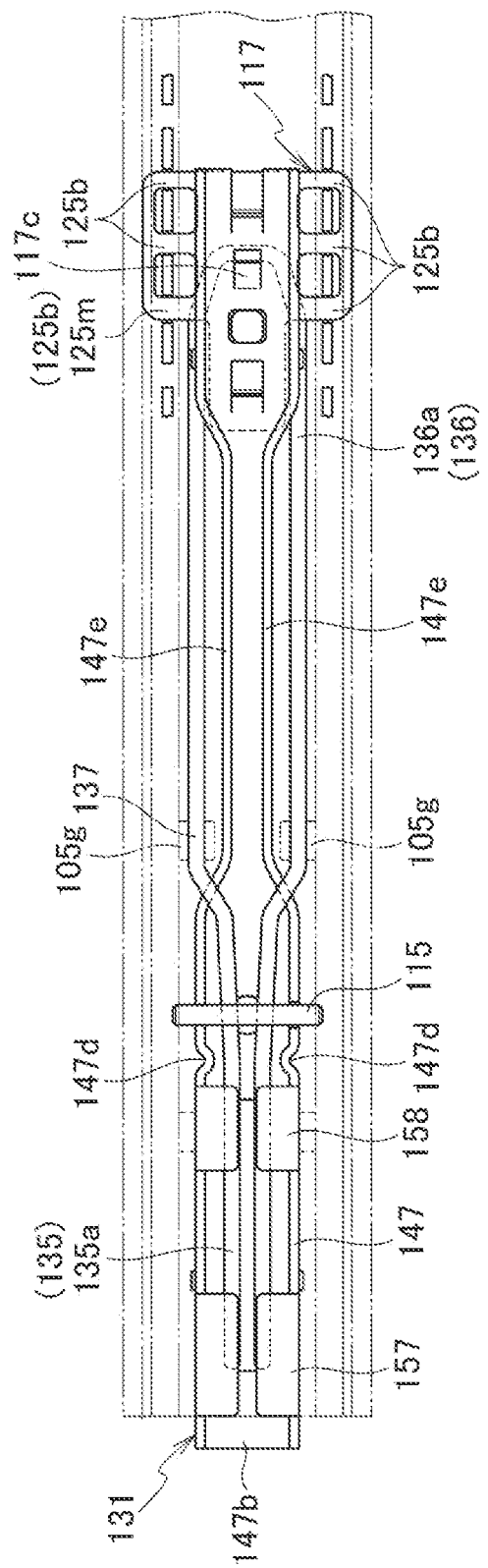
FIG. 12 is a plan view of the lever member and the biasing member as viewed from above.

As illustrated in FIGS. 11A and 11B, the connection end 169 includes the upper surface 169*b*1, the side surfaces 169*b*2 extending downward from both left and right ends of the upper surface 169*b*1, and a lower surface 169*b*3 provided from the lower ends of the left and right side surfaces 169*b*2 toward the left and right inner sides. A pair of left and right recessed portions 171 extending in the vehicle front-rear direction are provided in the upper inner surface and the lower inner surface of the connection end 169. In addition, the engaging hole 133*a* is formed in the lower surface 169*b*3 of the connection end 169 so as to straddle the left and right recessed portions 171 and 171.

The connection end 169 of the operation member 133 has protrusions 172 above and below where the intermediate portions of the cylindrical member in the left-right direction protrude inward, and the pair of front ends of the biasing member 132 are disposed at portions where the clearance in the connection end 169 in the up-down direction is large (recessed portions 171).

In a state before the operation member 133 is attached to the lever member 131, the front end of the biasing member 132 (abutment portion) is configured to come in contact with the front upper support surfaces 157*a* of the lever member 131. In a state in which the operation member 133 is attached to the lever member 131 (see FIG. 14), the front end of the biasing member 132 (abutment portion) is inserted inside the operation member 133 and comes in contact with the lower surface of the operation member 133 (the inner surface of the upper surface 169*b*1) from below, thereby biasing the operation member 133 upward.

As illustrated in FIG. 14, the lever member 131 is turnably supported at the upper side walls 105*b* of the upper rail 105 by the shaft member 115, and the biasing member 132 is engaged with the engaging portion 105*g* in such a way as to prevent the biasing member 132 from moving downward. In addition, on the left and right upper side walls 105*b* of the upper rail 105, a rear lower protrusion 148 is formed at a position forward of the bearing hole 105*f* in the vehicle front-rear direction as a rear lower support portion protruding from both upper side walls 105*b* in such a way as to bend toward the sides facing each other. The rear lower protrusion 148 is formed by cutting and raising the upper side walls 105b toward the inner side.

The biasing member 132 engages with the lower surface of the rear end of the operation member 133 (the inner surface of the upper surface 169b1) from below at a position below the front upper support surface 157a, thereby biasing the operation member 133 upward. Thus, the upper surface 169b1 of the operation member 133 comes into contact with the pair of upper support surfaces (front upper support surface 157a and rear upper support surface 158a). At this time, a clearance C1 is provided in the up-down direction between the front lower support surface 147c provided in the lever member 131 and the lower surface 169b3 of the rear end of the operation member 133, and a clearance C2 is provided in the up-down direction between the rear lower support surface 148a provided in the upper rail 105 and the lower surface 169b3 of the rear end of the operation member 133.

Next, the operation of the seat sliding device 101 configured as described above will be described.

FIG. 14 illustrates a standby state in which the lock teeth 125b of the lock member 117 engage with the locking grooves 127 of the lower rail 103 and are locked thereto, in the lock position (a non-operating state in which the operation member 133 is not operated). In this state, the operation member 133 is pressed against the pair of upper support surfaces (front upper support surface 157a and rear upper support surface 158a) by the front end of the biasing member 132 (abutment portion). The pressing force (biasing force) of the front end of the biasing member 132 is larger than a force that causes the operation member 133 to move downward due to its own weight. Meanwhile, the rotational moment for rotationally biasing the lock member 117 in the lock release position direction is smaller than the rotational moment in the lock position direction generated by the pressing force (biasing force) at the rear end of the biasing member 132, and thus the standby state described above is maintained.

Figure 15:
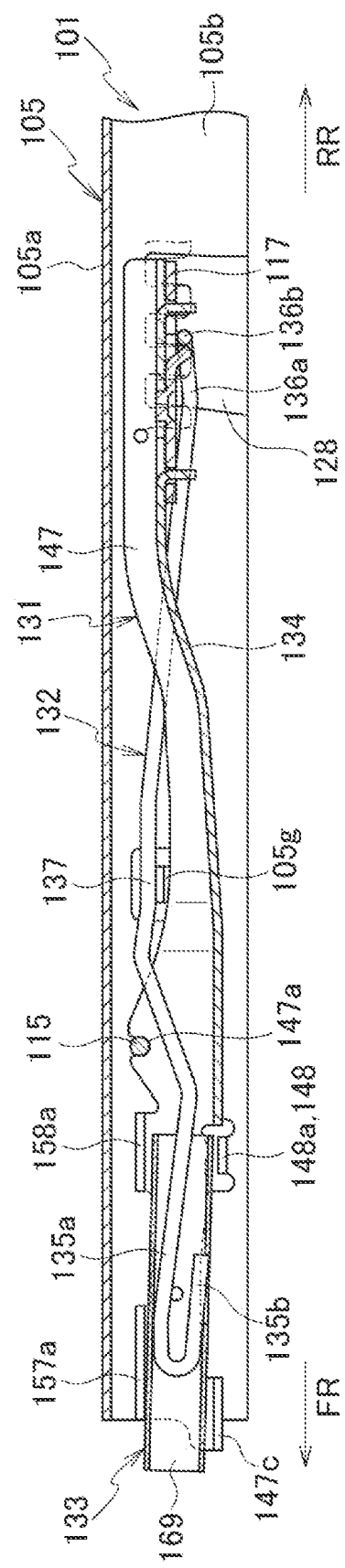
FIG. 15 is a side sectional view of the enlarged main portion of the seat sliding device illustrating a state in which the operation member operates in the lock release direction.

From the state illustrated in FIG. 14, when the occupant lifts the grip 168 of the operation member 133, the operation member 133 turns around the contact point between the front upper support surface 157a and the upper surface 169b1 of the operation member 133 as a fulcrum, and the rear end of the operation member 133 moves downward by pushing down the front end of the biasing member 132 (abutment portion). In this state, when the grip 168 of the operation member 133 is further lifted, the lower surface 169b3 of the rear end of the operation member 133 comes into contact with the rear lower support surface 148a provided in the upper rail 105, and the operation member 133 turns around the contact point between the rear lower support surface 148a and the lower surface 169b3 of the rear end of the operation member 133 as a fulcrum. As a result, the upper surface 169b1 of the operation member 133 turns and lifts the front upper support surface 157a of the lever member 131 upward, and the lever member 131 turns the lock portion of the lock member 117 in the lock release position direction (see FIG. 15).

Accordingly, the lever member 131 swings and rotates clockwise in FIG. 14 around the shaft member 115. At this time, the lever member 131 pushes the lock member 117 downward due to the swinging rotation, and the biasing member 132 (rear biasing member 136) elastically deforms downward. As a result, the lock teeth 125b come away from the lock grooves 127 of the lower rail 103, and thus the lock is released (lock release state). When the lock is released, it is possible to move the seat (not illustrated) back and forth with respect to the floor surface of the vehicle of the lower rail 103 side together with the upper rail 105, and secure the seat position desired by the occupant.

When the occupant releases his or her hand from the operation member 133 in a state where the seat position is determined, the biasing member 132 (rear biasing member 136) presses the lock member 117 upward, and the lever member 131 swings and rotates to return to the standby state illustrated in FIG. 14. At this time, the lever member 131 swings and rotates counterclockwise in FIG. 14 around the shaft member 115.

Figure 16:
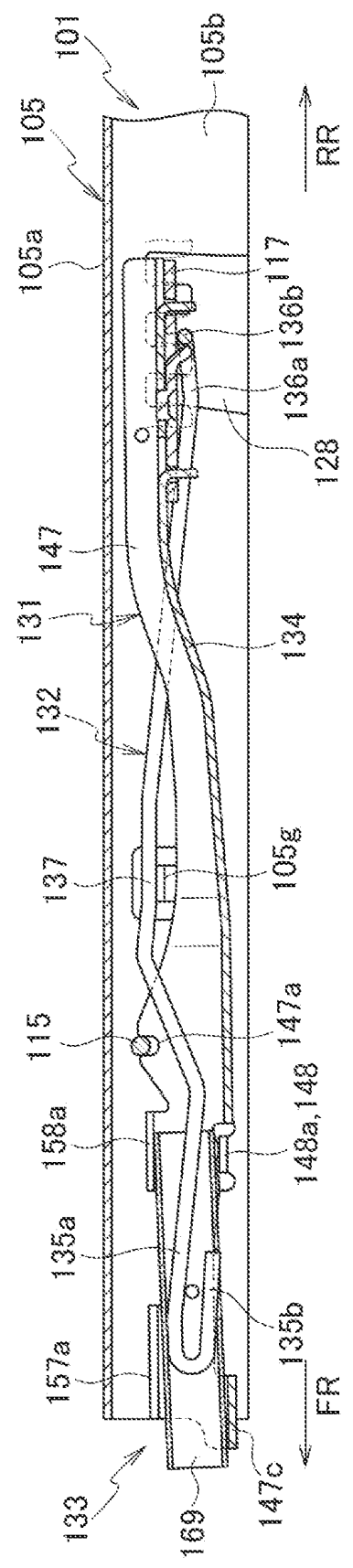
FIG. 16 is a side sectional view of the enlarged main portion of the seat sliding device illustrating a state in which a load in the anti-lock release direction acts on the operation member.

In the state illustrated in FIG. 14, when a load is applied to the operation member 133 in the anti-lock release direction (downward), the operation member 133 turns around the contact point between the rear upper support surface 158a and the upper surface 169b1 of the operation member 133 as a fulcrum, and the operation member 133 can move downward by the amount of the clearance C1 between the lower surface 169b3 of the operation member 133 and the front lower support surface 147c (see FIG. 16). At this time, the lever member 131 rotates downward around the interlock position of the main lock tooth 125m, and the lower surface of the front end side of both side walls 147 comes in contact with the rear lower support surface 148a to prevent the lever member 131 from moving downward, thereby preventing the recessed grooves 147a from coming away from the shaft member 115.

The operational effect of the seat sliding device 101 according to the present embodiment will be described below.

(1) A seat sliding device 101 includes a lower rail 103 extending in a vehicle front-rear direction, an upper rail 105 configured to move relative to the lower rail 103 in a longitudinal direction, a lever member 131 turnably supported about an axis in a left-right direction with respect to the upper rail 105, a lock member 117 provided in a rear end of the lever member 131 and including lock portions (lock teeth 125b) configured to be movable between a lock position where the lock portions engage with locked portions (lock grooves 127) formed in the lower rail 103 and a lock release position where the lock portions come away from the locked portions, a biasing member 132 configured to bias the lock portions in a lock position direction, and an operation member 133 connected to a front end of the lever member 131. The upper rail 105 includes a shaft member 115 disposed in such a way as to straddle both left and right side walls of the upper rail 105 (left and right upper side walls 105b). The lever member 131 includes a pair of left and right side walls 147 extending relative to the upper rail 105 in the longitudinal direction, at inner sides of both the left and right side walls of the upper rail 105, and bearings (recessed grooves 147a) provided at the pair of left and right side walls 147 and engaging with the shaft member 115. Each of the left and right bearings has a surface in contact with the shaft member 115 at one point in the up-down direction by being biased by the biasing member 132. In the pair of left and right bearings, the surface in contact with the shaft member 115 in one bearing is formed as an arc-shaped surface with a radius slightly larger than an outer diameter of the shaft member 115, and the surface in contact with the shaft member 115 in the other bearing is formed as a flat surface extending relative to the upper rail 105 in the longitudinal direction.

There is a small clearance in the vehicle front-rear direction between the arc-shaped surface of the bearing and the shaft member 115. However, since the shaft member 115 is biased so as to be pressed against the bottom surface of the arc-shaped surface of the bearing, when the shaft member 115 moves in the vehicle front-rear direction, this contact point is displaced along the arc-shaped surface of the bearing. For this reason, the above clearance is not felt as a rattling of the upper rail 105 in the vehicle front-rear direction.

In addition, since the surface in contact with the shaft member 115 in the other bearing is formed as a flat surface extending in the vehicle front-rear direction, the shaft member 115 has a clearance in the vehicle front-rear direction. Accordingly, since the side wall 147 having the other bearing can move in the vehicle front-rear direction in a relative manner, the lever member 131 can be freely positioned between the pair of left and right side walls 147 of the upper rail 105. It should be noted that there is a small clearance in the vehicle front-rear direction between one bearing having the arc-shaped surface and the shaft member 115, and thus the above movement is not prevented.

This makes it possible to suppress rattling of the upper 105 when the seat is locked. In addition, the axial displacement of the shaft member 115 in the axial direction is absorbed due to variations in the concentricity of the shaft mounting holes (bearing hole 105*f* and recessed groove 147*a*), and thus, it is possible to prevent the side walls 147 of the lever member 131 from being pressed against the inner surface of the upper side wall 105*b* of the upper rail 105.

(2) The lower rail 103 includes a lower bottom wall 103*a* extending in the vehicle front-rear direction, a pair of left and right lower outer walls 103*b* extending upward from both end edges of the lower bottom wall 103*a* in the left-right direction, lower upper walls 103*d* extending inward in the left-right direction from upper end edges of the pair of left and right lower outer walls 103*b*, lower inner walls 103*e* extending downward from the pair of left and right lower upper walls 103*d*, and a plurality of lock grooves 127 provided in the pair of left and right lower inner walls 103*e* in the vehicle front-rear direction. Both the left and right side walls of the upper rail 105 are disposed inward of the pair of left and right lower inner walls 103*e* of the lower rail 103 in the left-right direction, and a plurality of lock teeth 125*b* which are configured to engage with the left and right lock grooves are provided in the lock portions of the lock member 117 in the vehicle front-rear direction. The plurality of lock teeth 125*b* include a main lock tooth 125*m*, which is formed with a larger width in the front-rear direction than the other lock teeth 125*b*, and the main lock tooth 125*m* is provided in the lock portion such that the main lock tooth 125*m* is positioned on the side wall 147 side in which one bearing is formed.

The main lock tooth 125*m* engages with the lock grooves 127 such that the main lock tooth 125*m* comes in contact with the lock grooves 127 in the vehicle front-rear direction, and the other lock teeth 125*b* engage with the lock grooves 127 such that there is a gap between the other lock teeth 125*b* and the lock grooves 127 in the vehicle front-rear direction. The main lock tooth 125*m* is provided on the side wall 147 side which has one bearing and is formed as an arc-shaped surface, and thus when a load is applied to the upper rail 105 in the vehicle front-rear direction in a locked state, the load is applied on the same side wall 147 side of the lever member 131, thereby reducing the load generated in the direction in which the lever member 131 is bent in the left-right direction. This makes it possible to prevent the generation of a load that causes the lever member 131 to rotate in the left-right direction, and prevent the side walls 147 of the lever member 131 from being pressed against the inner surface of the upper side wall 105*b* of the upper rail 105.

(3) Each of the left and right bearings is formed as a recessed groove 147*a* that is open on an upper side, and a surface in contact with the shaft member 115 at one point in the up-down direction is formed on the bottom surface of the recessed groove 147*a*.

Since the shaft member 115 is biased in such a way as to press against the bottom surface of the bearing (recessed groove 147*a*), the bearing can be formed as the recessed groove 147*a* that is open on an upper side. As a result, there are no elements of the lever member 131 above the shaft member 115, and this makes it possible to improve the degree of freedom in terms of the use of space in the up-down direction inside the upper rail 105.

In a state in which the shaft member 115 is attached to the upper rail 105, the recessed grooves 147*a* of the lever member 131 engage with the shaft member 115 from below, which results in good ease of assembly to the lever member 131.

Although the embodiments of the present invention have been described above, these embodiments are merely illustrative in order to facilitate understanding of the present invention, and the present invention is not limited to these embodiments. The technical scope of the present invention is not limited to the specific technical matters disclosed in the above embodiments, and also includes various modifications, changes, alternative techniques and the like which can be readily derived therefrom For example, the pair of front ends of the biasing member 132 have the same length, however, they may have different lengths in the longitudinal direction (one front is long and the other front end is short). In addition, although the retaining portion 135*b* is provided at the respective front ends of the biasing member 132, it may be provided at only one front end thereof.

Further, the front acting portions 135*a* of the biasing member 132 are inserted inside the operation member 133, however, the outer lower surface (lower surface 169*b*3) may be biased upward from the lower side.

Furthermore, the upper protrusions 157 and 158 are respectively provided at the upper ends of both side walls 147, however, they may be provided only at the upper end of one side wall 147.

In addition, the lower ends of the front ends of the lever member 131 are connected to each other by the front lower wall 147*b*, however, the front upper protrusions 157 may be connected to each other. In this case, the lever member 131 has an inverted U-shape with an open lower end, in which the lower wall 134 connecting the lower ends of the left and right side walls 147 serves as the upper wall connecting the upper ends thereof.

What is claimed is:
1. A seat sliding device comprising:
a lower rail extending in a vehicle front-rear direction;
an upper rail configured to move relative to the lower rail in a longitudinal direction;
a lever member turnably supported about an axis in a left-right direction with respect to the upper rail;
a lock member provided in a rear end of the lever member and including lock portions configured to be movable between a lock position where the lock portions engage with locked portions formed in the lower rail and a lock release position where the lock portions come away from the locked portions;

a biasing member configured to bias the lock portions in a lock position direction; and an operation member connected to a front end of the lever member, wherein the upper rail includes a shaft member disposed in such a way as to straddle both left and right side walls of the upper rail, the lever member includes:

a pair of left and right side walls extending relative to the upper rail in the longitudinal direction, at inner sides of both the left and right side walls of the upper rail; and bearings provided at the pair of left and right side walls and engaging with the shaft member, each of left and right bearings has a surface in contact with the shaft member at one point in an up-down direction by being biased by the biasing member, and in the left and right bearings, a surface in contact with the shaft member in one bearing is formed as an arc-shaped surface with a radius slightly larger than an outer diameter of the shaft member, and a surface in contact with the shaft member in another bearing is formed as a flat surface extending relative to the upper rail in the longitudinal direction.

2. The seat sliding device according to claim 1, wherein the lower rail includes:

a lower bottom wall extending in the vehicle front-rear direction;

a pair of left and right lower outer walls extending upward from both end edges of the lower bottom wall in the left-right direction;

lower upper walls extending inward in the left-right direction from upper end edges of the pair of left and right lower outer walls;

lower inner walls extending downward from the pair of left and right lower upper walls; and a plurality of lock grooves provided in the pair of left and right lower inner walls in the vehicle front-rear direction, both the left and right side walls of the upper rail are disposed inward of the pair of left and right lower inner walls of the lower rail in the left-right direction, a plurality of lock teeth which are configured to engage with the plurality of lock grooves are provided in the lock portions of the lock member in the vehicle front-rear direction, the plurality of lock teeth includes a main lock tooth, which is formed with a larger width in the vehicle front-rear direction than other lock teeth, and the main lock tooth is provided in a lock portion such that the main lock tooth is positioned near a side wall in which the one bearing is formed.

3. The seat sliding device according to claim 1, wherein each of the left and right bearings is formed as a recessed groove that is open on an upper side, and a surface in contact with the shaft member at one point in the up-down direction is formed on a bottom surface of the recessed groove.

\* \* \* \* \*